A. LEE.
RAKE CLEANER.
APPLICATION FILED JUNE 24, 1913.
1,133,729.
Patented Mar. 30, 1915.
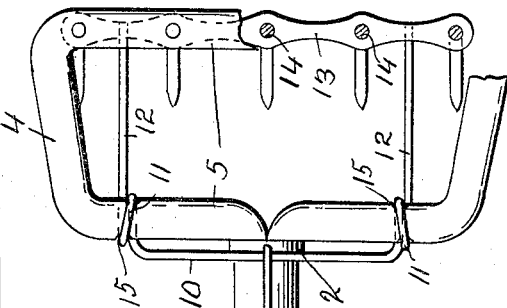
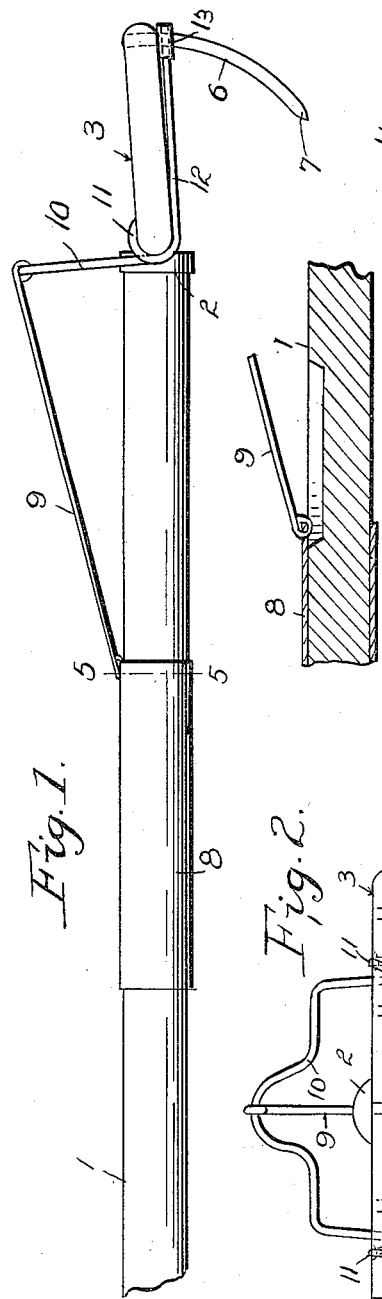
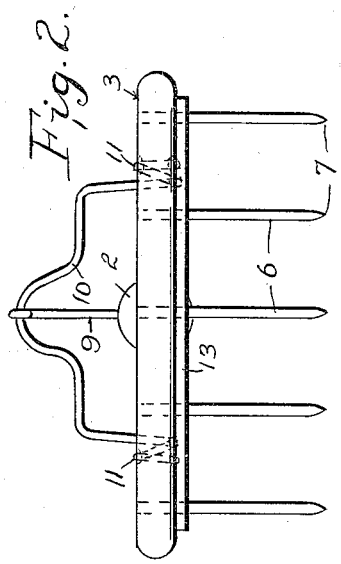
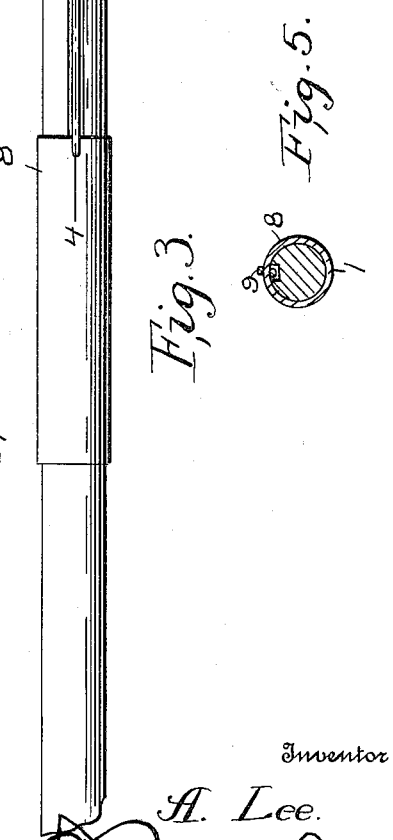
Inventor
A. Lee.
Witnesses

UNITED STATES PATENT OFFICE.

ANDERSON LEE, OF SALT LAKE CITY, UTAH.

RAKE-CLEANER.

1,133,729.  Specification of Letters Patent.  Patented Mar. 30, 1915.

Application filed June 24, 1913. Serial No. 775,489.

Be it known that I, ANDERSON LEE, a citizen of the United States, residing at Salt Lake City, in the county of Salt Lake and State of Utah, have invented certain new and useful Improvements in Rake-Cleaners; and I do hereby declare the following to be a full, clear, and exact description of the invention, such as will enable others skilled in the art to which it appertains to make and use the same.

This invention relates to new and useful improvements in rakes and has for its object the provision of a rake which is so constructed as to permit the use of a cleaning device.

Another object of my invention is the provision of a cleaning device which may be easily and quickly used without in any way inconveniencing the operator.

A still further object of my invention is the simplification of such devices and rendering them cheap to manufacture and effective in use.

With the above and other objects in view I now proceed to describe my invention in the following specification and accompanying drawings, in which, Figure 1 is a side view in elevation of my improved rake as it would appear with the cleaning attachment applied thereto, Fig. 2 is an end view in elevation of my improved rake, Fig. 3 is a top plan view of my improved rake with a portion of the tooth carrying bar broken away to more clearly illustrate the cleaning bar, Fig. 4 is a longitudinal sectional view of the handle of my improved rake, and Fig. 5 is a transverse sectional view taken on line 5—5 of Fig. 1.

Referring to the drawings by characters of reference 1 indicates the usual handle portion of a rake having secured at one end thereof a ferrule 2. The tooth carrying member indicated generally by the numeral 3, preferably comprises a substantially rectangular member formed of the end portions 4, and the sides 5. One of these sides is preferably formed by the terminals of the members which are sharpened and bent outwardly to form a pin which is adapted to extend into an aperture formed in the end of the rake handle and thereby secure the tooth carrying member to the handle. This tooth carrying member is preferably provided along the side opposite the attaching means with a series of apertures through which the curved teeth 6 are adapted to extend, these teeth being preferably sharpened as clearly shown at 7, in accordance with the usual practice.

A sleeve 8 is slidably mounted on the handle portion and provided at one extremity with an aperture through which the end of the link is adapted to pass and by means of which said link is pivotally secured to the sleeve. The opposite end of the link is connected as clearly illustrated to the upstanding portion 10, which is preferably formed of wire and coiled, as illustrated at 11, around the side 5 adjacent to the handle. The end of the coil 11 opposite the upstanding portion 10 is extended, as clearly shown at 12, at substantially right angles to the upstanding portion 10 and passes through apertures formed in the cleaning bar 13. This cleaning bar being preferably provided with apertures 14 through which the rake teeth are adapted to pass when the device is in place.

An annular groove 15 is formed in the side 5 of the rectangular frame near each end and is arranged to receive the loop 11 formed on the stripping element and serve to retain said loop in place.

It will be clearly seen from the foregoing that when it is desired to make use of my improved rake the sleeve is pulled back to its rearmost position and in so doing the cleaning bar will be brought to its uppermost position with relation to the rake teeth and the usual operation of raking may then proceed. Should trash or other matter be gathered upon the teeth of the rake the only operation necessary is the pushing forward of the sleeve with relation to the handle which will cause the cleaning bar 13 to slide downwardly on the teeth and thereby strip the teeth of anything which may have gathered thereon.

While in the foregoing I have shown and described the preferred embodiment of my invention, I wish it to be understood that I may change the specific arrangements of parts without in any way departing from the spirit and scope of my invention.

What I claim is:—

The combination with a rake comprising a handle, a rectangular frame secured to one end of the handle, said frame including front and rear bars, and side bars connecting the front and rear bars, teeth secured to the front bar and extending downwardly therefrom, the rear bars being provided with a pair of spaced grooves, a cleaning device comprising a cleaner bar slidable on the rake teeth, rearward extensions secured to the cleaner bar, loops formed at the rearmost ends of the rearward extensions, said loops lying in the grooves, upward extensions formed on the loops, said extensions projecting at right angles to the rearward extensions of the cleaner bar, said upward extensions being joined to each other and means slidable on the rear handle to rock the upward extensions and thereby cause the stripping bar to descend.

In testimony whereof I affix my signature in presence of two witnesses.

ANDERSON LEE.

Witnesses:
LELAND LEWIS,
L. VANDENAKKER.